(12) United States Patent
Steffen (10) Patent No.: US 11,879,575 B2
(45) Date of Patent: Jan. 23, 2024

(54) ENHANCED GIMBAL JOINT FOR CONDUITS

(71) Applicant: BLUE ORIGIN LLC, Kent, WA (US)

(72) Inventor: Brock Steffen, Covington, WA (US)

(73) Assignee: Blue Origin LLC, Kent, WA (US)

( * ) Notice: Subject to any disclaimer, the term of this patent is extended or adjusted under 35 U.S.C. 154(b) by 209 days.

(21) Appl. No.: 17/344,595

(22) Filed: Jun. 10, 2021

(65) Prior Publication Data

US 2022/0397219 A1 Dec. 15, 2022

(51) Int. Cl.
*F16L 27/04* (2006.01)
*F16J 3/04* (2006.01)

(52) U.S. Cl.
CPC .............. *F16L 27/04* (2013.01); *F16J 3/048* (2013.01)

(58) Field of Classification Search
CPC ......... F16L 27/04; F16L 27/0857; F16J 3/048
See application file for complete search history.

(56) References Cited

U.S. PATENT DOCUMENTS

| | | | | |
|---|---|---|---|---|
| 1,886,332 A * | 11/1932 | Flavin | ...................... | F16L 55/02 285/332.1 |
| 2,813,731 A * | 11/1957 | Ward | ...................... | F16L 27/04 285/263 |
| 2,824,758 A * | 2/1958 | Cattrell | ................. | F16L 27/067 277/503 |
| 2,921,803 A * | 1/1960 | Ward | ....................... | F16L 27/04 285/262 |
| 7,371,027 B2 * | 5/2008 | Mochizuki | .............. | F16B 35/06 403/309 |
| 7,677,606 B2 * | 3/2010 | Rohwedder | ............. | F16L 27/02 285/226 |
| 2004/0217590 A1 * | 11/2004 | Challender | ............. | F16L 27/06 285/260 |
| 2014/0230228 A1 * | 8/2014 | Whitlock | ................ | F16B 43/02 411/371.1 |
| 2019/0086009 A1 * | 3/2019 | Thorogood | ............... | F16D 3/36 |

* cited by examiner

*Primary Examiner* — James M Hewitt, II
(74) *Attorney, Agent, or Firm* — K&L Gates LLP (57) ABSTRACT

A gimbal assembly for a flexible conduit configured to convey a medium. The gimbal assembly includes a first component including a first plurality of struts that terminate in a first socket defining a first cavity of a first geometric configuration. The gimbal assembly also includes a second component including a second plurality of struts that terminate in a second socket defining a second cavity of a second geometric configuration. A joint fastener is configured to couple the first socket to the second socket. The joint fastener includes a first portion that geometrically corresponds to the first cavity and a second portion that geometrically corresponds to the second cavity. The first portion is configured to be immovably seated within the first cavity, and the second portion is configured to be movably retained by the second socket such that the first component can rotate relative to the second component.

16 Claims, 8 Drawing Sheets

ENHANCED GIMBAL JOINT FOR CONDUITS

FIELD

The present disclosure is generally related to the mechanical control of fluids in an extreme environment and, more specifically, a flexible gimbal joint configured to facilitate motion in pressurized conduits.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a gimbal assembly for a flexible conduit configured to convey a medium is disclosed herein. The gimbal assembly includes a first component including a first plurality of struts that terminate in a first socket defining a first cavity of a first geometric configuration. The gimbal assembly also includes a second component including a second plurality of struts that terminate in a second socket defining a second cavity of a second geometric configuration. A joint fastener is configured to couple the first socket to the second socket. The joint fastener includes a first portion that geometrically corresponds to the first cavity and a second portion that geometrically corresponds to the second cavity. The first portion is configured to be immovably seated within the first cavity, and the second portion is configured to be movably retained by the second socket such that the first component can rotate relative to the second component.

In various aspects, a joint fastener configured for use within a gimbal assembly of a flexible conduit configured to covey a medium is disclosed. The gimbal assembly includes a first component including a first socket and a second component including a second socket, the joint fastener including: a first portion geometrically corresponding to a first cavity of the first socket; and a second portion geometrically corresponding to a second cavity of the second socket; wherein the joint fastener is configured to couple the first socket to the second socket, wherein the first portion is dimensionally configured to be immovably seated within the first cavity, and wherein the second portion is configured to be movably retained by the second socket such that the first component can rotate relative to the second component about the second socket.

In various aspects, a method of assembling a gimbal assembly for a flexible conduit configured to convey a medium is disclosed. The gimbal assembly includes a first component including a first socket, a second component including a second socket, and a joint fastener, wherein the joint fastener includes a first portion that geometrically corresponds to a first cavity of the first socket, and wherein the joint fastener includes a second portion that geometrically corresponds to a second cavity of the second socket. The method includes: inserting the first portion of the joint fastener through the second cavity of the second socket of a second gimbal component; seating the first portion of the joint fastener within the first cavity of the first socket, such that the geometric correspondence between the first portion and the first cavity renders the joint fastener immovable relative to the first socket; seating the second portion of the joint fastener within the second socket, such that the second portion is movably retained by the second socket and the first component can rotate relative to the second component; and securing the joint fastener to the first component via a lock nut.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner. Additionally, it shall be appreciated that any feature depicted in any of the foregoing exemplifications can be combined and/or attenuated to achieve any of the objectives and discussed herein.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that terms such as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

Before explaining various aspects of the present disclosure in detail, it shall be appreciated that the aspects disclosed herein are exclusively intended for illustrative purposes. Unless otherwise indicated, the terms and expressions employed herein have been chosen for the purpose of describing the illustrative examples for the convenience of the reader and are not for the purpose of limitation thereof. Specifically, the term "gimbal" shall include any mechanism configured to permit the rotation of an object about at least one axis. Although certain non-limiting aspects described below include gimbals with a ball and socket configuration, it shall be appreciated that, according to other non-limiting aspects, the gimbal can include alternate configurations that permit the rotation of an object about at least one axis. Additionally, the term "conduit" shall include any pipe, channel, tube, or hose configured to transport a medium as part of a larger system. Although certain non-limiting aspects may describe a conduit including a pipe-like configuration, the present disclosure contemplates other non-limiting aspects including conduits of varying geometrical configurations. The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other. Finally, the term "mission critical" is used to describe any environment, system, apparatus, or method that is associated with extreme conditions, limited opportunities for rework, and/or catastrophic failures.

Additionally, the non-limiting aspects described below may include conduits with an enhanced robustness to internal stresses caused by pressurized fluids. However, it shall be appreciated that the non-limiting aspects described herein can be similarly implemented to improve any type of conduit (e.g., electrical, radio frequency waveguide, heat pipe). Accordingly, it shall be appreciated that the gimbals disclosed herein can be implemented to enhance the mechanical robustness of any conduit configured to transmit any medium, depending on user preference and/or intended application.

Furthermore, the following description is exclusively intended to enable a person of ordinary skill in the art and shall not undermine the versatility of the inventions disclosed herein. Although the present disclosure describes certain non-limiting aspects wherein a gimbal is installed in a conduit for implementation in outer space, it shall be appreciated that such a conduit can be similarly effective in any environment (e.g., industrial, subterranean, under water, desert, arctic) with extreme conditions (e.g., vibration, pressure, temperature, humidity, radiation) that can impose severe stresses on the conduit. In other words, the present disclosure can provide similar benefits in any implementation, including more conventional, lower-stress environments. As such, it shall be appreciated that the conduits disclosed herein represent a universal improvement in the art and provide the following benefits regardless of geometric configuration, medium, or environment.

Various conduits (e.g., tubing, pipes, hoses) are known to convey a medium between different components and/or subsystems of a larger system. Depending on the system, rigid and/or flexible conduits may be preferable to perform in an expected environment for a particular application. For example, the transport of fluids under pressure may call for rigid conduits, which may be more capable of efficiently managing the pressure in comparison to flexible conduits (e.g., a bellows). Rigid conduits may be able to more efficiently sustain internal pressures in comparison to known flexible conduits, which would require a larger nominal wall thickness to achieve the same degree of reliability under similar conditions. Furthermore, flexible conduits may be subject to unpredictable bending and/or twisting while conveying a pressurized medium, while rigid conduits can provide more predictable movements. Material specifications (e.g., ASTM E595) and restraints (e.g., outgassing) can further limit the application of known flexible conduits, because the materials used to imbue said conduits with the desired flexibility can be non-compliant to specifications and/or incompatible with the medium the conduit is configured to convey. Thus, known flexible conduits are not preferable for the conveyance of a pressurized medium.

However, many mission critical applications require the transmission of pressurized fluids in environments that are prone to extreme external conditions (e.g., thermal stress, excessive vibrations, acoustic excitation). Although known rigid conduits may be preferable to sustain internal and external pressures, such conduits are susceptible to certain structural failures after exposure to such conditions. Rigidity may be preferable for the conveyance of a pressurized medium, but can render known conduits vulnerable to cracking, wear, and buckling when exposed to extreme conditions. Known rigid conduits may be most vulnerable at critical locations (e.g., bellows), where excessive bending can result in fatigue and ultimately, conduit failure. Depending on the application, such failures can be catastrophic. Although flexible conduits may be more resilient under such conditions, for at least the foregoing reasons, they are not preferable for the conveyance of pressurized mediums. Accordingly, there is a need for an apparatus with flexible conduits with enhanced robustness to internal and external stresses. Such apparatus can include a combination of discrete components (e.g., struts, sockets, joint fasteners, etc.) that are geometrically configured to distribute internal and external forces experienced by the conduit without compromising the flexibility of the joint. Such components, including the joint fastener described herein, can provide said conduits with an unexpected combination of strength and flexibility that enhances them for mission critical applications.

Figure 1:
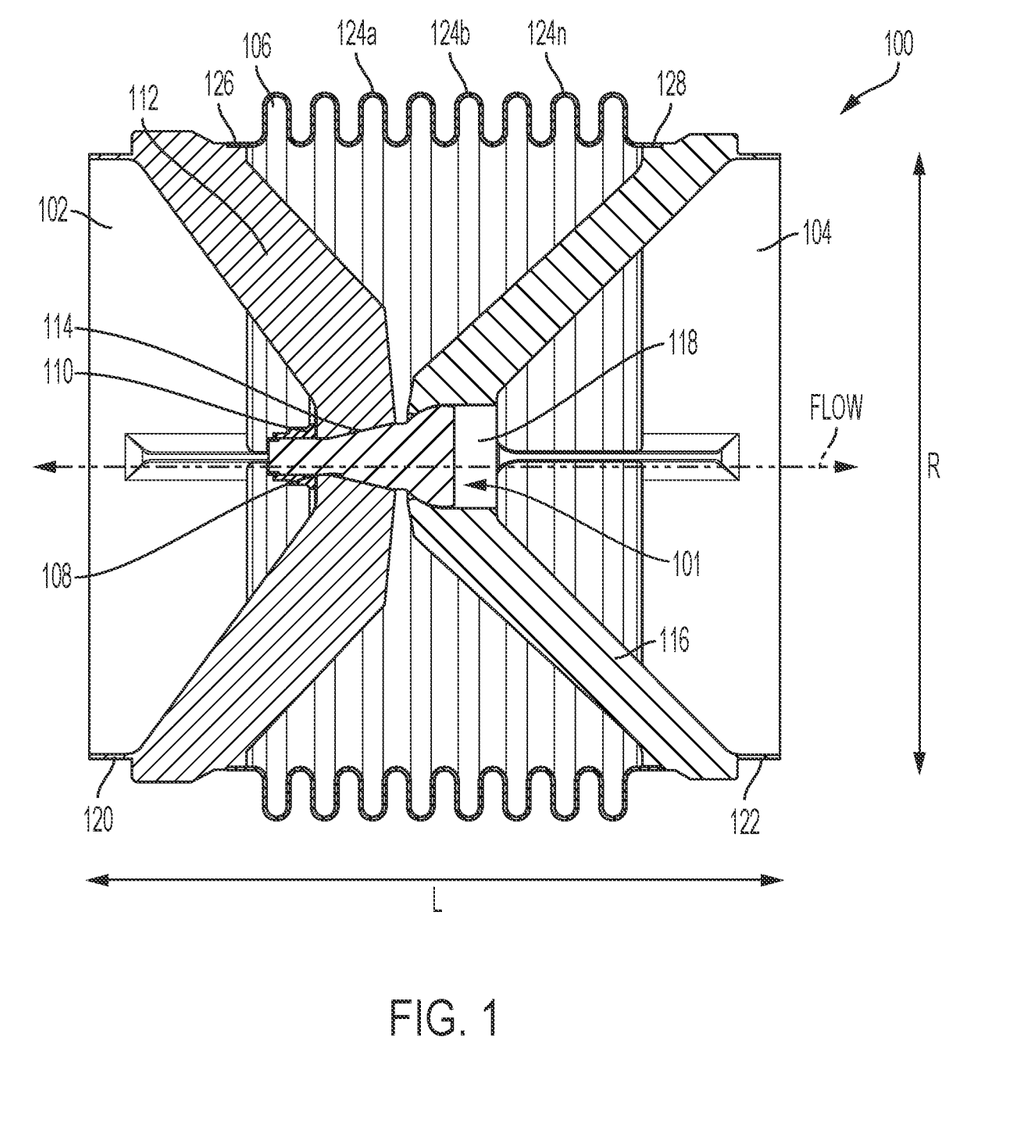
FIG. 1 illustrates a sectioned side view of an enhanced conduit including a gimbal assembly, in accordance with at least one non-limiting aspect of the present disclosure.

Referring now to FIG. 1, a sectioned side view of an enhanced conduit 100 including a gimbal assembly 101 is depicted in accordance with at least one non-limiting embodiment of the present disclosure. According to the non-limiting aspect of FIG. 1, the gimbal joint 100 can include a first conduit component 102 and a second conduit component 104, each of which defines a circular cross-section of radial dimension R. However, according to other non-limiting aspects, the first conduit component 102 and second conduit component 104 can include cross-sections of varying geometries (e.g., rectangular, elliptical, square, triangular, non-uniform) depending on the desired conduit, medium, user preference, and/or intended application. The first conduit component 102 and second conduit component 104 can be mechanically coupled via a bellows 106 that extends along a longitudinal axis L and each includes a joining surface 120, 122 configured to interface with other sections of conduit and/or other components. For example, the joining surfaces 120, 122 may be dimensionally configured to engage corresponding joining surfaces on other components, such that the conduit 100 of FIG. 1 can establish a desired communication between components and/or sections of conduit.

In further reference to FIG. 1, the bellows 106 can be flexibly configured such that the conduit 100 can be easily routed while offering resistance to mechanical excitations and stresses imposed on the conduit 100. According to the non-limiting aspect of FIG. 1, the bellows 106 can be separately formed and mechanically attached (e.g., via welding, adhesives, fasteners) to the first conduit component 102 and second conduit component 104. However, according to other non-limiting aspects, the bellows 106 can be integral to the first conduit 102 and second conduit 104. In still other non-limiting aspects, the bellows 106 can be mechanically configured to establish a desired seal between the first conduit component 102 and the second conduit component 104. For example, the bellows 106 can be configured to interface a gasket, such that the interface can mitigate the risk of leaking between the bellows 106, the first conduit component 102, and second conduit component 104. In other words, the first conduit component 102, the second conduit component 104, and the bellows 106 of FIG. 1 can be preferably configured to define an internal cavity capable of conveying a desired medium through the conduit 100 in a desired way.

According to the non-limiting aspect of FIG. 1, the bellows 106 can be configured to flex in 360 degrees about its longitudinal axis to accommodate bends, but otherwise to only minimally expand and/or contract along the longitudinal axis. As such, the bellows 106 of FIG. 1 can include any number of pleats 124a, 124b, 124n to achieve the desired degree of flexibility and/or range of motion. Regarding the construction of the conduit 100, the bellows 106 can be secured to the first conduit component 102 at surface 126 and to the second conduit component 104 at surface 128. However, according to other non-limiting aspects, the bellows 106 can be integral to the first and second conduit components 102, 104, as previously discussed. Additionally and/or alternatively, bellows 106 can include a multi-layer construction composed of two or more plies.

Moreover, the conduit 100 of FIG. 1 and, more specifically the bellows 106, can be constructed from any desirable material to achieve any desired structural, mechanical, insulative, and/or chemical properties, in accordance with user preference and/or intended application. For example, the conduit 100 of FIG. 1 can be constructed from a metal, such as a nickel-chromium superalloy (e.g. Inconel®), to provide the conduit 100 with oxidation and corrosion resistance depending on the medium and/or environment. However, any number of materials can be selected to achieve any number of structural, mechanical, insulative, and/or chemical properties. Additionally and/or alternatively, the bellows 106 can be composed of a different material than the first and second conduit components 102, 104. According to the non-limiting aspect where the bellows 106 includes a multi-layer construction, different plies of the bellows 106 can be constructed from the same or different material.

Still referring to FIG. 1, the first conduit component 102 and the second conduit component 104 can include a first plurality of struts 112 and a second plurality of struts 116, respectively. According to the non-limiting aspect of FIG. 1, the first and second plurality of struts 112, 116 can be mechanically coupled to an interior surface of the first conduit component 102 and the second conduit component 104. Alternatively, the first and second plurality of struts 112, 116 can be integral to the first conduit component 102 and the second conduit component 104. Regardless, the first and second plurality of struts 112, 116 can be angularly oriented such that each strut of the first and second plurality 112, 116 extends away from the inner surface of the first and second conduit component 102, 104, into the internal cavity. The first and second plurality of struts 112, 116 of FIG. 1 can provide the conduit 100 with internal structural support, thereby enhancing conduit 100 resilience to extreme conditions.

According to the non-limiting aspect of FIG. 1, each strut of the first plurality 112 can be angularly oriented to extend away from the first conduit component 102 towards the second plurality of struts 116. Likewise, each strut of the second plurality 116 can be angularly oriented to extend away from the second conduit component 104 towards the first plurality of struts 112. However, it shall be appreciated that the angular orientation of each strut can be attenuated in accordance with user preference and/or intended application. Likewise, although each plurality 112, 116 of the non-limiting aspect of FIG. 1 includes fours struts, it shall be appreciated that other non-limiting aspects contemplate varying numbers of struts. According to some non-limiting aspects, the first plurality 112 can include different numbers of struts than the second plurality 116. According to other non-limiting aspects, a single strut can be used in lieu of either the first or second plurality 112, 116. Additionally, each strut of the first and second plurality of struts 112, 116 depicted in FIG. 1 includes a flat and narrow form. However, according to other non-limiting aspects, the struts can be include varying shapes and sizes. Generally, it shall be appreciated that the geometric configuration of the first and second pluralities of struts 112, 116 illustrated in FIG. 1 can be attenuated to provide the conduit 100 with a desired structural property (e.g., strength, weight) in accordance with user preference and/or intended application.

In further reference to FIG. 1, each strut of the first plurality of struts 112 can terminate in a first socket 114 of the gimbal assembly 101 and each strut of the second plurality of struts 116 can terminate in a second socket 118 of the gimbal assembly 101. According to some non-limiting aspects, the first socket 114 and the second socket 118 may be integrally formed from the same material as the struts 112, 116, respectively. In other words, the convergence of the struts themselves can define the sockets. However, according to other non-limiting aspects, the first socket 114 and the second socket 118 can separately formed and mechanically attached to the respective plurality of struts 112, 116. Regardless, the first plurality of struts 112 and second plurality of struts 116 can be oriented such that the first socket 114 faces and aligns radially with the second socket 118. As will be further described in reference to FIG. 2, the first socket 114 and the second socket 118 can collectively receive and retain a joint fastener 108 to form an articulating joint of the gimbal assembly 101.

Figure 2:
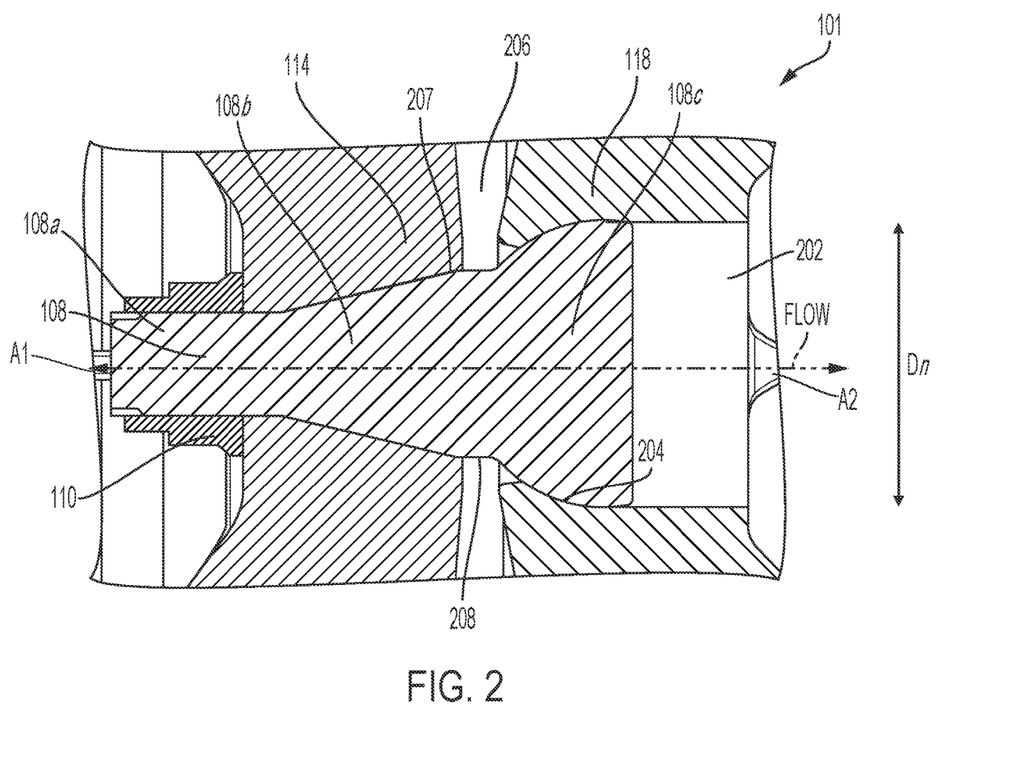
FIG. 2 illustrates a sectioned side view of the gimbal assembly of the conduit of FIG. 1, in accordance with at least one non-limiting aspect of the present disclosure.

Referring now to FIG. 2, a sectioned side view of the gimbal assembly 101 of the conduit 100 of FIG. 1 is depicted in accordance with at least one non-limiting aspect of the present disclosure. According to the non-limiting aspect of FIG. 2, the gimbal assembly 101 can include the first socket 114, the second socket 118, and the joint fastener 108, as previously described. The first socket 114 and the second socket 118 can be mechanically coupled (or integrally formed from) the first and second plurality of struts 112, 116 (FIG. 1), respectively, and oriented to face each other within the internal cavity defined by the first conduit component 102, second conduit component 104, and bellows 106. According to the non-limiting aspect of FIG. 2, the first and second sockets 114, 118 can collectively define an aperture 206 that can traverses through the body of each socket 114, 118 along the longitudinal axis L (FIG. 1). As will be discussed, the aperture 206 can be geometrically configured to accommodate and properly seat the joint fastener 108, whose geometrical configuration will also be described in further detail below.

The joint fastener 108 of FIG. 2 can be geometrically configured to achieve a particular range of motion throughout the gimbal assembly 101. According to the non-limiting aspect of FIG. 2, the joint fastener 108 can include a first portion 108a, a second portion 108b, and a third portion 108c, each of which can include different geometrical features selected to facilitate a proper engagement with the sockets 114, 118, a desired motion of the gimbal assembly 101, and a preferred structural and/or mechanical robustness of the conduit 100. For example, according to the non-limiting aspect of FIG. 2, the first portion 108a can be cylindrically formed, the second portion 108b can be frustoconically tapered such that it decreases in cross-sectional diameter $D_n$ as the second portion 108b extends longitudinally away from the second socket 118, and the third portion 108c can include a hemispheric form that further expands in diameter as it extends longitudinally away from the first socket 114.

According to the non-limiting aspect of FIG. 2, at least a portion of the first portion 108a of the joint fastener 108 can be threaded and configured to engage corresponding tapped threads of a locking nut 110 on a side of the aperture 204 of the first conduit component 102 opposite the second conduit component 102. Accordingly, the first portion 108a and lock nut 110 can collaborate to cantilever the joint fastener 108 longitudinally towards the second conduit component 104, thereby preventing the joint fastener 108 from traversing longitudinally through the conduit 100 (FIG. 1). However, the first portion 108a of the joint fastener 108 and lock nut 110 can be alternately configured to establish varying connections between the first socket 114 and the joint fastener 108. For example, according to some non-limiting aspects, the first portion 108a and locking nut 110 can be configured to permit a rotation of the joint fastener 108 about the longitudinal axis, while still preventing its longitudinal traversal.

Although the non-limiting aspect of FIG. 2 includes a joint fastener 108 of a particular form, in other non-limiting aspects, the joint fastener 108 can include any number of portions 108a, 108b, 108c, 108n of varying geometric configurations with varying dimensions. For example, according to some non-limiting aspects, the joint fastener 108 may omit the the second portion 108b and the cylindrical first portion 108a may abruptly transition to the hemispherical third portion 108c. Other non-limiting aspects contemplate a third portion 108c that is substantially spherically formed. Some non-limiting aspects include a joint fastener 108 that includes but a single portion that is substantially spherically formed. According to such aspects, the joint fastener 108 can be secured to the first conduit component 102 via a separate fastener. In still other non-limiting aspects, the third portion 108c may be omitted and the frustoconical second portion 108b may be configured to interface with the a portion of the aperture 206 within the second socket 118, thereby limiting the range of motion of the gimbal assembly 101. As such, the non-limiting aspect of FIG. 2 is illustrative of just one of many joint fastener 108 configurations contemplated by the present disclosure.

In further reference to FIG. 2, each of the aperture 206, the first socket 114, and the second socket 118 can be geometrically configured to collectively accommodate the joint fastener 108 in a manner that facilitates a desired range of motion through the gimbal assembly 101. For example, the first socket 114 can include a first joint 207 that defines a frustoconically tapered cavity decreasing in cross-sectional diameter $D_n$ as the first socket 114 extends longitudinally away from the second socket 118. The frustoconical form of the cavity defined by the first joint 207 can be inverse to the frustoconical taper of the second portion 108b of the joint fastener 108. Additionally, the taper—and more specifically, the diameter $D_n$—defined by the first joint 207 can be dimensionally configured relative to the second portion 108b, such that the first socket 114 accommodates and seats the second portion 108b of the joint fastener 108 in accordance with user preference and/or intended application. In other words, the joint fastener 108 connects the first joint 207 of the first socket 114 (FIG. 1) to the second joint 204 of the second socket 118. Accordingly, the geometric configuration of the joint fastener 108 can be particularly selected to more effectively manage the internal and external forces exerted on the conduit 100 (FIG. 1). It shall be appreciated that, because the joint fastener 108 is discrete relative to the first socket 114 and second socket 118, the gimbal assembly 101 can be specifically tailored to distribute the aforementioned forces in a way that distinguishes the gimbal assembly 101 from known ball-and-socket joints. This not only improves the stress distribution through the conduit 100, but imbues the gimbal assembly 101 with a certain degree of customization that is ideal for mission critical applications.

For example, according to the non-limiting aspect of FIG. 2, the diameters $D_n$ defined by the first joint 207 can be substantially similar to, if not marginally larger than, corresponding diameters $D_n$ of the frustoconical taper of the second portion 108b. In other words, the joint fastener 108 can include a portion 108b that geometrically corresponds to the first joint 207. According to some non-limiting aspects, the portion 108b can be dimensionally configured to be immovably seated within the first joint 207. For example, the first joint 207 can tightly engage the joint fastener 108 (e.g., friction fit) such that the first joint 207 can reduce an amount of unintentional rotation between the joint fastener 108 and the first joint 207. However, according to other non-limiting aspects, a dimensional tolerance between the first joint 207 and joint fastener 108 can be adjusted to allow a rotation of the joint fastener 108 within the first joint 207. Additionally, the frustoconical form of the cavity defined by the first joint 207 in conjunction with the frustoconical taper of the second portion 108b can assist in stress distribution throughout the gimbal assembly 101. For example, the frustoconical form can assist in the distribution of forces exerted longitudinal on the gimbal assembly 101 by the second conduit component 104 (FIG. 1). Additionally and/or alternatively, the frustoconcial form can facilitate expansion and contraction of the joint fastener due to exposure to extreme thermal stresses or mechanical excitations.

Although the cavity defined by the first joint 207 in FIG. 2 includes a frustoconical taper inverse to the second portion 108b of the joint fastener 108, in other non-limiting aspects the first joint 207 can define cavities of varying geometries that correspond to the varying geometries and portions of the joint fastener 108. Accordingly, the first joint 207 and joint fastener 108 can be specifically configured to achieve a desired fit and tolerance to environmental conditions.

Still referring to FIG. 2, the second socket 118 can define a cylindrical cavity 202 that extends longitudinally towards the first socket 114 and ends in a hemispherical second joint 204. Similar to the first joint 207, the hemispherical second joint 204 can decrease in cross-sectional diameter $D_n$ as the joint fastener 108 extends longitudinally away from the second socket 118 towards the first socket 114. Additionally, the hemisphere—and more specifically, the diameter $D_n$—defined by the second joint 204 can be dimensionally configured relative to the third portion 108c, such that the second socket 118 can accommodate and seat the third portion 108c of the joint fastener 108 in accordance with user preference and/or intended application. According to the non-limiting aspect of FIG. 2, the diameters $D_n$ defined by the second joint 204 can be substantially similar to, if not marginally larger than, corresponding diameters $D_n$ of the hemispherical third portion 108c. As such, the first joint 207 can tightly engage the joint fastener 108 (e.g., a friction fit) such that the first joint 207 can reduce an amount of unintentional rotation between the joint fastener 108 and the first joint 207. Alternatively, the first joint 207 can be connected to the joint fastener 108 via a non-outgassing adhesive and/or additional fasteners (e.g., Araldite AV 138, DC 6—1104, DC93500, Eccobond Solder 56C, Redux 312, RTV 566, RTV S 691, RTV S 695, Scotch Weld EC 2216, Solithane 113, etc.).

The non-limiting aspect of FIG. 2 contemplates a configuration where the second portion 108b of the joint fastener 108, the first socket 114, the first gimbal component 102 (FIG. 1), and the first plurality of struts 112 (FIG. 1) can move in unison along with joint fastener 108, as a single unit. However, according to other non-limiting aspects, a dimensional tolerance between the second joint 204 and joint fastener 108 can be adjusted to allow a desired range of motion of the second joint 204 about the third portion 108c of the joint fastener 108. Additionally and/or alternatively, according to some non-limiting aspects, the gimbal assembly 101 can define one or more flow apertures A1, A2 that traverse at least one of the first joint, 207, the second joint 204, and the joint fastener 108, or combinations thereof, to further facilitate the traversal of the medium through the conduit 100 (FIG. 1).

In further reference to FIG. 2, it shall be appreciated that the joint fastener 108, first joint 207, second joint 204, and lock nut 110 can be configured such that the joint fastener 108 cantilevers away from the first socket 118 towards the second socket 114. The lock nut 110 can be configured to apply an adjustable preload between the joint fastener 108 and the first socket 114 as it is tightened. It shall be appreciated that such a preload can be attenuated according to user preference and/or intended application. For example, the preload can be applied to reduce a gap between the joint fastener 108 and the first socket 114. Accordingly, the locking nut 110 can enhance the robustness of the gimbal assembly 101 and conduit 100 under extreme conditions. For example, the locking nut 110 can be tightened to apply a predetermined preload that will resist thermal expansion and/or contraction as temperatures fluctuate.

The third portion 108c of the joint fastener 108 can remain in contact with the hemispherical second joint 204 and can prohibit the second socket 118 from traversing longitudinally through the conduit 100 in either direction. However, the first socket 114, second socket 118, and joint fastener 108 collectively define a gap in the aperture 206 between the first socket 114 and second socket 118 and—due to the corresponding hemispherical engagement of the second joint 204 and third portion 108c of the joint fastener 108—the first and second sockets 114, 118 can rotate and/or pivot relative to one another about the second joint 204. Since the first and second sockets 114, 118 are connected to the first and second conduit components 102, 104 (FIG. 1) via the pluralities of struts 114, 116, the first and second conduit components 102, 104 (FIG. 1) can also rotate and/or pivot relative to the other about the second joint 204. The bellows 106 (FIG. 1) can accommodate this motion while preserving the external integrity of the conduit 100 (FIG. 1) such that the medium remains contained within the conduit 100 (FIG. 1) as the gimbal assembly 101 moves.

Accordingly, the gimbal assembly 101 of FIG. 2 can imbue the conduit 100 (FIG. 1) with a desired plasticity, similar to known flexible conduits. However, the internal configuration of struts 112, 116, sockets 114, 118, joints 204, 207, and joint fastener 108 provides the conduit with a structural form and strength that makes the conduit 100 ideal for transporting a pressurized medium without any of the stability or material issues associated with known flexible conduits. Likewise, the struts 112, 116, sockets 114, 118, joints 204, 207, and joint fastener 108 can support the transport of pressurized mediums and enable the conduit 100 (FIG. 1) to the extreme conditions common to mission critical environments, without any of the structural detriments associated with known rigid conduits.

The robustness of the gimbal assembly 101 of FIG. 2 and conduit 100 of FIG. 1 can be further enhanced for mission critical environments based on selected materials. For example, at least one of the struts 112, 116, sockets 114, 118, joints 204, 207, and joint fastener 108, or any combination thereof can include materials that are light-weight and strong (e.g., aluminum, Kevlar, composites, etc.) to reduce structural, weight, and power requirements associated with the conduit 100. The conduit components 102, 104 and bellows 106 may include plastics that limit contamination and outgassing (e.g., ECTFE, ETFE, FEP, PCTFE, PFA, PEEK, PSU, PTFE, PVDF, Ultem®, Vespel® Polyimides, etc.). Additionally, the overall geometry of the conduit 100 and gimbal assembly 101 can be specifically configured to eliminate undesired radio-frequency (RF) and/or microwave resonance. Additionally and/or alternatively, any component of the conduit 100 or gimbal assembly 101 can include electromagnetic interference (EMI) shielding materials (e.g., steel, copper, silver, alloys, etc.) configured to reduce parasitic signal interference. As such, the composition and/or geometric configuration of the conduit 100 and gimbal assembly 101 can be specifically configured to provide additional advantages for the transport of a particular medium.

Figure 3:
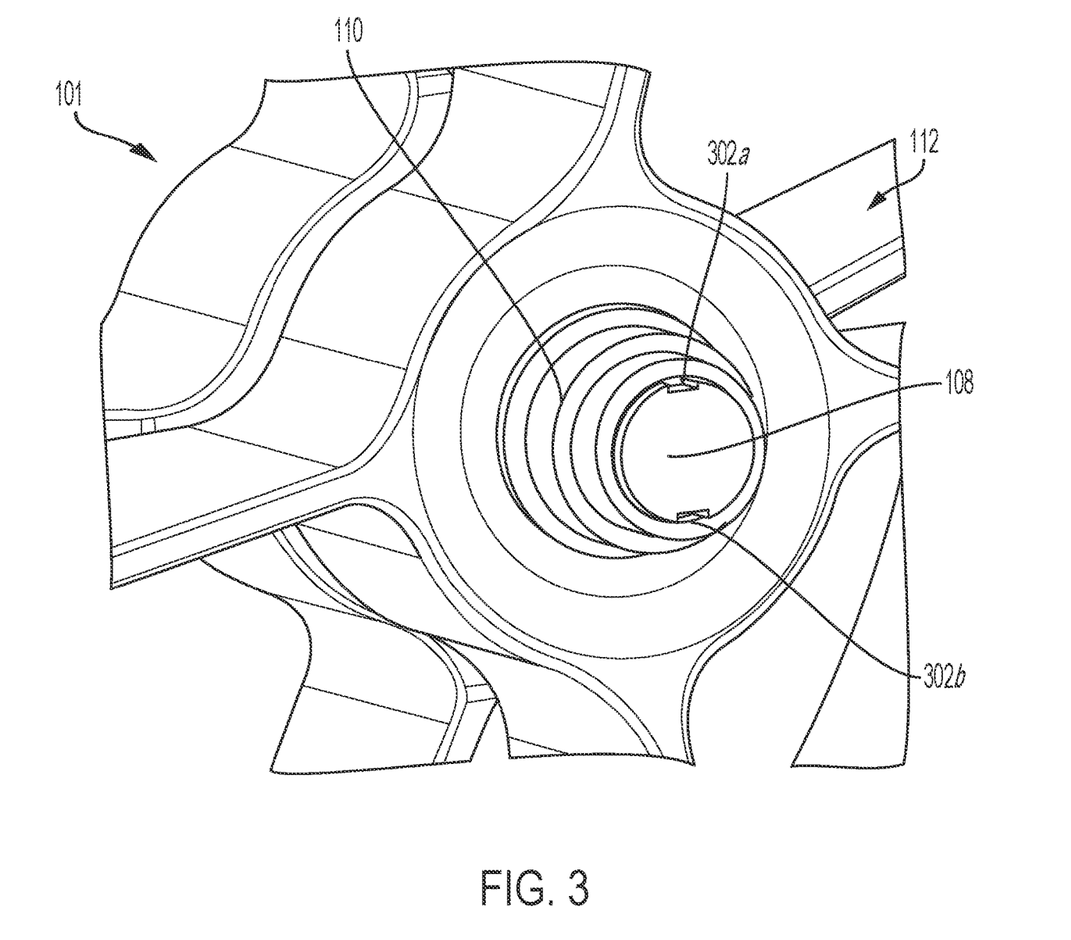
FIG. 3 illustrates a perspective view of the gimbal assembly of FIGS. 1 and 2, in accordance with at least one non-limiting aspect of the present disclosure.

Referring now to FIG. 3, a perspective view of the gimbal assembly 101 of FIGS. 1 and 2 is depicted in accordance with at least one non-limiting aspect of the present disclosure. As previously discussed, the lock nut 110 can secure the joint fastener 108 to the the first socket 114. According to the non-limiting aspect of FIG. 3, the lock nut 110 can include tapped threads configured to engage corresponding threads on the first portion 108a (FIG. 2) of the joint fastener 108. As such, the lock not 110 can be configured to screw onto the joint fastener 108 to secure the joint fastener 108 to the first socket 114 and/or apply a preload to the joint fastener 108. However, according to other non-limiting aspects, the lock not 110 can be alternately configured to secure the joint fastener 108 to the first socket 114. For example, the lock nut 110 can be configured to be press-fit and/or thermally-fit onto the joint fastener 108.

As previously discussed, the gimbal assembly 101 of FIGS. 1-3 can enable the first and second conduit components 102, 104 to move relative to one another, thereby facilitating a robust flexibility of the conduit 100. The locking nut 110 can prevent a catastrophic failure of the conduit 100 by properly securing to joint fastener 108 to the first socket 114. However, the motion of the first and second conduit components 102, 104 about the hemispherical, second joint 204 (FIG. 2) and stresses generated by the medium as it traversing the conduit 100 can threaten the integrity of the connection between the lock nut 110 and fastener joint 108. This issue can be exacerbated if the lock nut 110 is exposed to extreme conditions in a mission critical environment. Accordingly, the gimbal assembly 110 of FIGS. 1-3 can be adjustably configured to apply preloads to the joint fastener 108 via the lock nut 110. For example, the lock nut 110 can be tightened to a predetermined preload via a preload tool (e.g., differential bearing preload wrench, etc.) in compliance with a specification (e.g., NASA-STD-108c0, etc.).

Additionally and/or alternatively, the gimbal assembly 110 of FIG. 3 can include a lock nut 110 that includes additional means of being secured to the joint fastener 108. According to the non-limiting aspect of FIG. 3, the lock nut 110 can include one or more stakes 302a, 302b, each configured to engage at least a portion of the lock nut 110. For example, a portion of the lock nut 110 can be either bent and/or swaged into each stake 302a, 302b of the joint fastener 108, thereby immobilizing the lock nut 110 from unintentional rotation about joint fastener 108. The stakes 302a, 302b can be further secured to the joint fastener 108 via an adhesive that complies with applicable material specifications (e.g., Araldite AV 138, DC 6—1104, DC93500, Eccobond Solder 56C, Redux 312, RTV 566, RTV S 691, RTV S 695, Scotch Weld EC 2216, Solithane 113, etc.).

Figure 4:
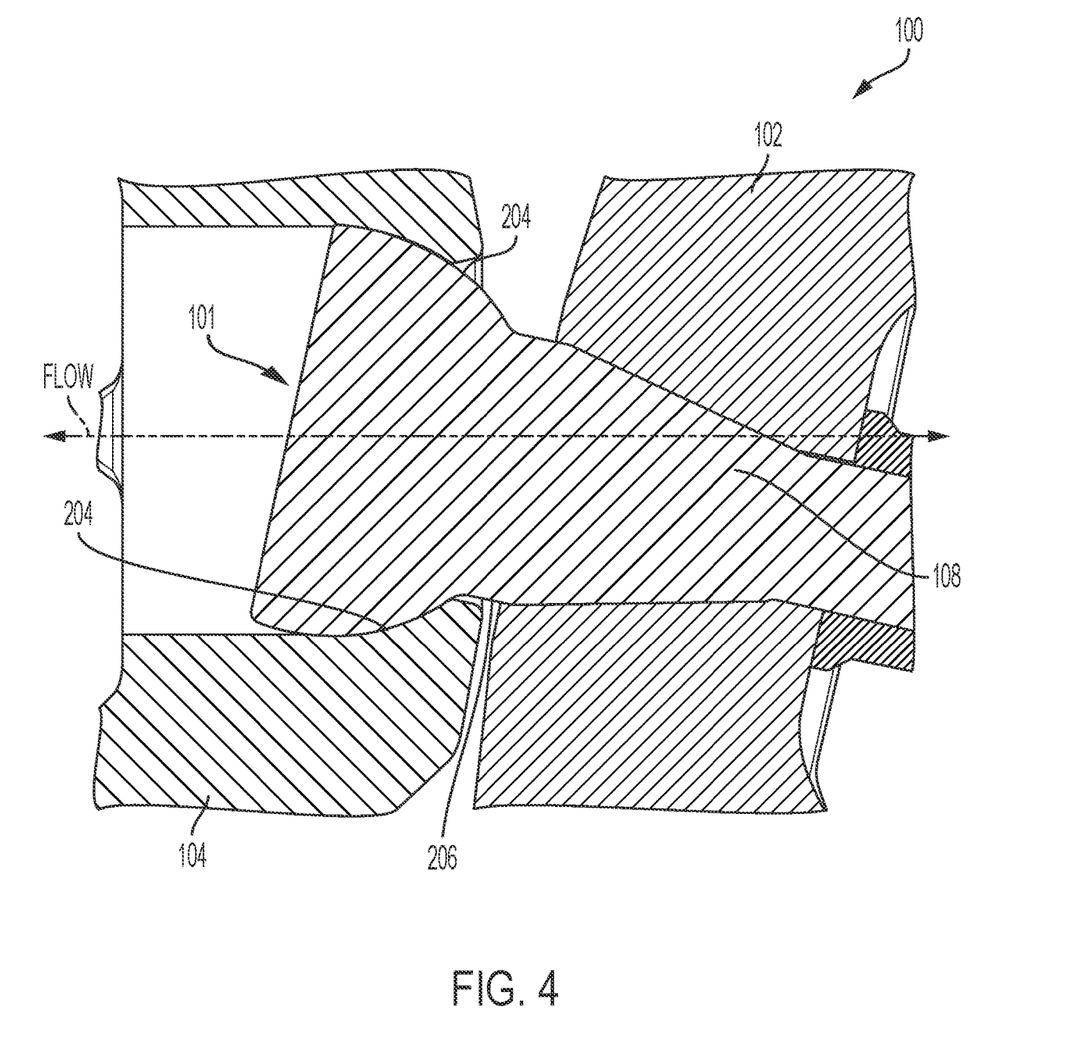
FIG. 4 illustrates another sectioned side view of the conduit 100 of FIGS. 1-3, in accordance with at least one non-limiting aspect of the present disclosure.

Referring now to FIG. 4, a sectioned side view of the conduit 100 of FIGS. 1-3 is depicted in accordance with at least one non-limiting aspect of the present disclosure. According to the non-limiting aspect of FIG. 4, the first conduit component 102 can pivot relative to the second conduit component 104 via the gimbal assembly 101. As previously discussed, hemispherical, second joint 204 enables the gimbal assembly 101 to facilitate 360 degree rotation of the conduit components 102, 104. Additionally, the gimbal assembly 101 configuration of FIGS. 1-4 can enable the first portion 108a (FIG. 2) and second portion 108b (FIG. 2) of the joint fastener 108 to tilt with the first conduit component 102, while the second joint 204 retains the connection between the third portion 108c of the joint fastener 108 and the second conduit component 104.

In further reference to FIG. 4, the degree to which the joint fastener 108 can tilt is determined by the gap in the aperture 206, which can be adjusted based on a desired range of motion for the gimbal assembly 110. For example, by increasing the aperture 206 and/or decreasing the hemispherical configuration of the second joint 204, the gimbal assembly 101 can achieve a greater degree of tilt. Alternatively, by decreasing the aperture 206 and/or increasing the hemispherical configuration of the second joint 204, the gimbal assembly 101 can be further constrained.

Figure 5:
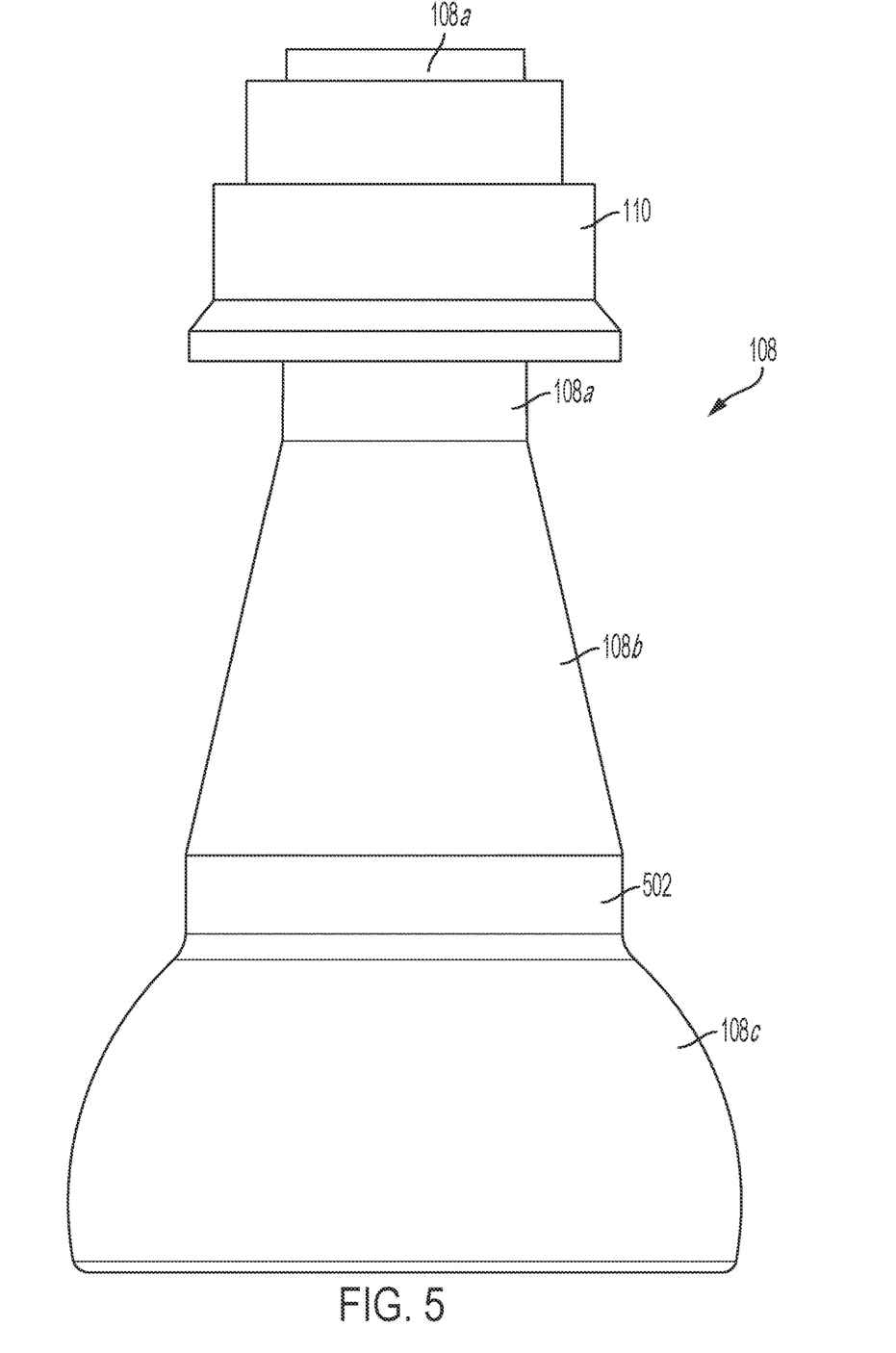
FIG. 5 illustrates a side view of a joint fastener of the gimbal assembly of FIGS. 1-4, in accordance with at least one non-limiting aspect of the present disclosure.

Referring now to FIG. 5, a side view of the joint fastener 108 of the gimbal assembly 101 of FIGS. 1-4 is depicted in accordance with at least one non-limiting aspect of the present disclosure. As previously discussed the joint fastener 108 can include a first portion 108a, a second portion 108b, and a third portion 108c, each of which can include different geometrical features selected to facilitate a proper engagement with the sockets 114, 118, a desired motion of the gimbal assembly 101, and a preferred structural and/or mechanical robustness of the conduit 100. For example, according to the non-limiting aspect of FIG. 2, the first portion 108a can be cylindrically formed, the second portion 108b can be frustoconically tapered, and the third portion 108c can include a hemispheric form. As discussed above, the hemispheric third portion 108c can be geometrically configured and dimensioned to fit to hemispherical, second joint 204 closely, so that a load imparted to joint fastener 108 can be distributed across hemispherical socket 204. Likewise, the tapered second portion 108b can be geometrically configured and dimensioned to fit to the tapered cavity defined by the first socket 114. Accordingly, the tapered second portion 108b can be in mechanical communication with the corresponding cavity of first socket 114.

According to the non-limiting aspect of FIG. 5, the frustoconically tapered second portion 108b can be separated from and connected to the hemispheric third portion 108c of the joint fastener 108 via cylindrical portion 502. Additionally, the engagement of the threaded first portion 108a and the lock nut 110 is well illustrated, with an end of the first portion 108a protruding through and out of the lock nut. As previously discussed, the first portion 108a of the joint fastener 108 and the lock nut 110 can be configured for threaded engagement. However, according to other non-limiting aspects, the lock nut can be press-fit, thermally-fit, and/or staked onto the first portion 108a of the joint fastener 108.

As previously discussed, the joint fastener 108 of FIG. 5 can be produced from any desirable material, including a nickel-chromium superalloy (e.g. Inconel®, etc.) or any other appropriate material that is suitable and durable for a given implementation. The hemispherical third portion 108c of the joint fastener 108 may be particularly susceptible to abrasion and/or wear as it moves about the hemispheric second joint 204. Accordingly, at least a portion of the hemispheric third portion 108c can be treated with a wear-resistant coating (e.g., vitro-lube, tungsten disulfide, diamond-like carbon, etc.). It shall be appreciated that other coatings can be selected and applied depending on user preference and/or intended implementation. Alternatively and/or additionally, the hemispheric second joint 204 can be similarly coated to reduce wear. In fact, any or all portions 108a, 108b, 108c of the joint fastener 108 can be coated and/or treated as appropriate to improve durability, strength, longevity and/or wear of the joint fastener 108. In still other non-limiting aspects, the joint fastener 108 can be heat-treated to achieve a improved degree of strength.

Although the non-limiting aspect of FIGS. 1-5 includes a joint fastener 108 of a particular form, in other non-limiting aspects, the joint fastener 108 can include any number of portions 108a, 108b, 108c, 108n of varying geometric configurations with varying dimensions. For example, according to some non-limiting aspects, the joint fastener 108 may omit the the second portion 108b and the cylindrical first portion 108a may abruptly transition to the hemispherical third portion 108c. Other non-limiting aspects contemplate a third portion 108c that is substantially spherically formed. Some non-limiting aspects include a joint fastener 108 that includes but a single portion that is substantially spherically formed. According to such aspects, the joint fastener 108 can be secured to the first conduit component 102 via a separate fastener. In still other non-limiting aspects, the third portion 108c may be omitted and the frustoconical second portion 108b may be configured to interface with the a portion of the aperture 206 within the second socket 118, thereby limiting the range of motion of the gimbal assembly 101. As such, the non-limiting aspect of FIG. 2 is illustrative of just one of many joint fastener 108 configurations contemplated by the present disclosure.

Figure 6A:
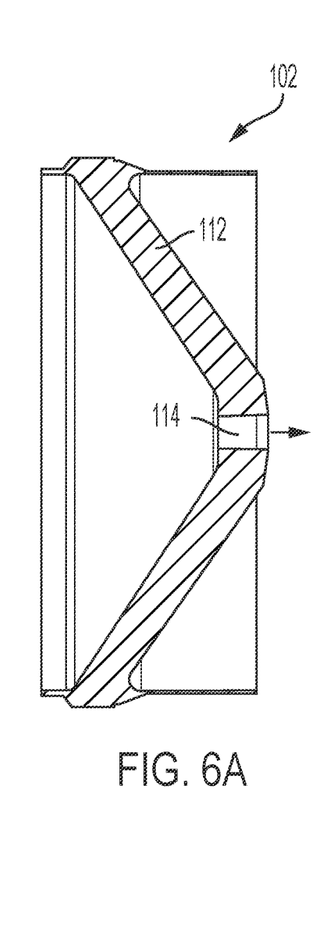
FIGS. 6A-C illustrate a conduit component in various stages of manufacture, in accordance with at least one non-limiting aspect of the present disclosure.
Figure 6B:
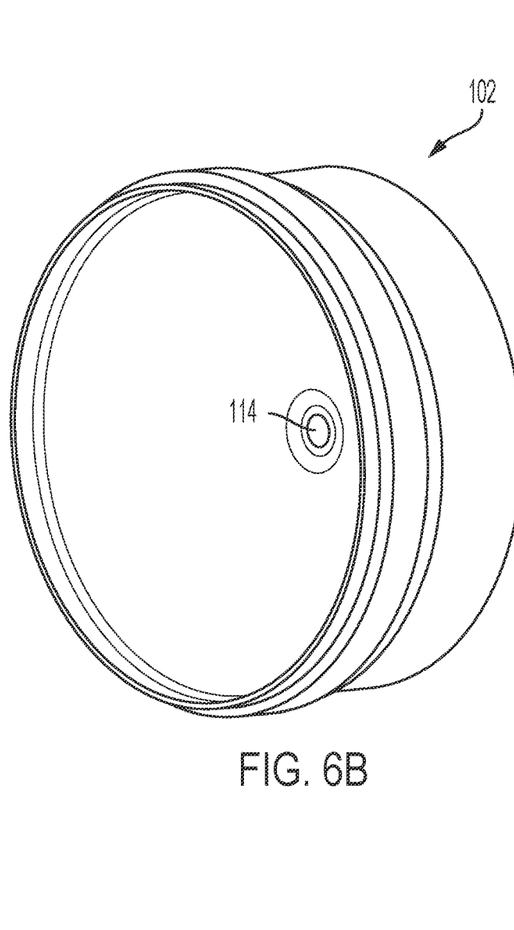
Figure 6C:
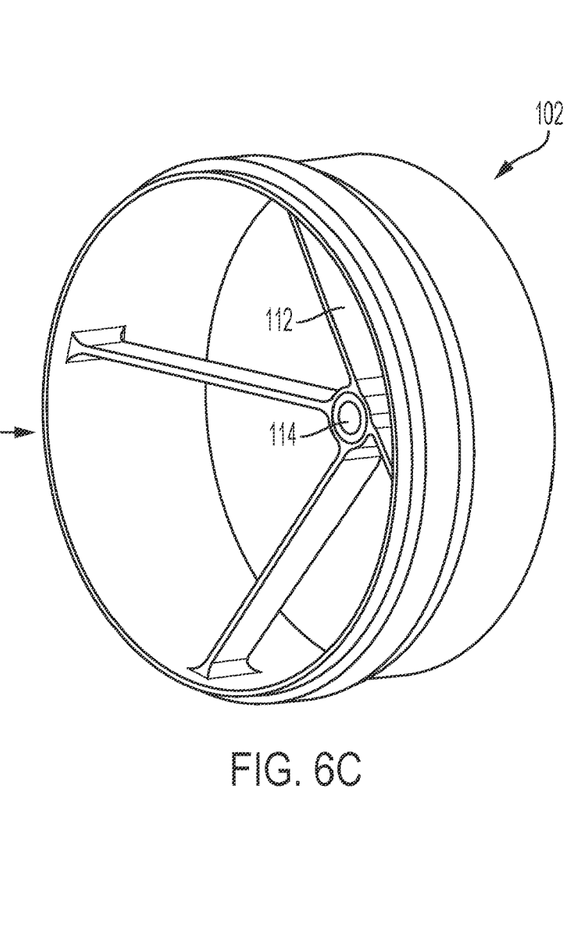

Referring now to FIGS. 6A-C, a conduit component 102 in various stages of manufacture of the conduit 100 of FIGS. 1-5 is depicted in accordance with at least one non-limiting aspect of the present disclosure. According to the non-limiting aspect of FIG. 6A, the first conduit component 102 can be produced from a single billet of cylindrical material (e.g. Iconel®). However, any suitable material will suffice depending on user preference and/or intended application. According to the non-limiting aspect of FIGS. 6A and 6B, the billet 102 can be turned and machined on each side to produce a ring that includes a frustoconical disc disposed within its center. An aperture can be machined through the center of the frustoconical disc, thereby defining the first socket 114. The billet can be further machined to remove sections of the frustoconical disc until a plurality of struts 112 remains in the intended configuration. The material can be removed via any suitable means of manufacturing, including electrical discharge machining (EDM). The plurality of struts 112 and socket 114 are depicted in FIG. 6C.

Still referring to FIGS. 6A-B, there are certain advantages to producing the conduit component 102 out of a single billet of material. For example, the conduit component 102 and its structural features 112, 114 will produce a conduit 100 (FIG. 1) imbued with an enhanced strength that us better suited for the transport of pressurized mediums in mission critical environments. Additionally, no welds are required, which streamlines quality engineering inspection and processes and reduces the need to comply with governing specifications. According to other non-limiting aspects, the conduit component 102 can be produced using alternative means of manufacture to achieve similar and/or additional benefits. For example, the conduit component 102 can be produced via three-dimensional printing. Three-dimensional printing could further streamline the production of the conduit component 102 by depositing a stream of the desired metal or alloy to build up the structure and features of the component 102, layer-by-layer. The resulting conduit 102 will still constitute a single block of material without the need for welded joints. However, difficult geometric maneuvers required to produce features such as fillets internal to the cavity can be circumvented via three-dimensional printing. As such, the conduit component 102 can be produced without awkward placement of the lathe and/or separate manufacturing steps and post-processing.

Figure 7:
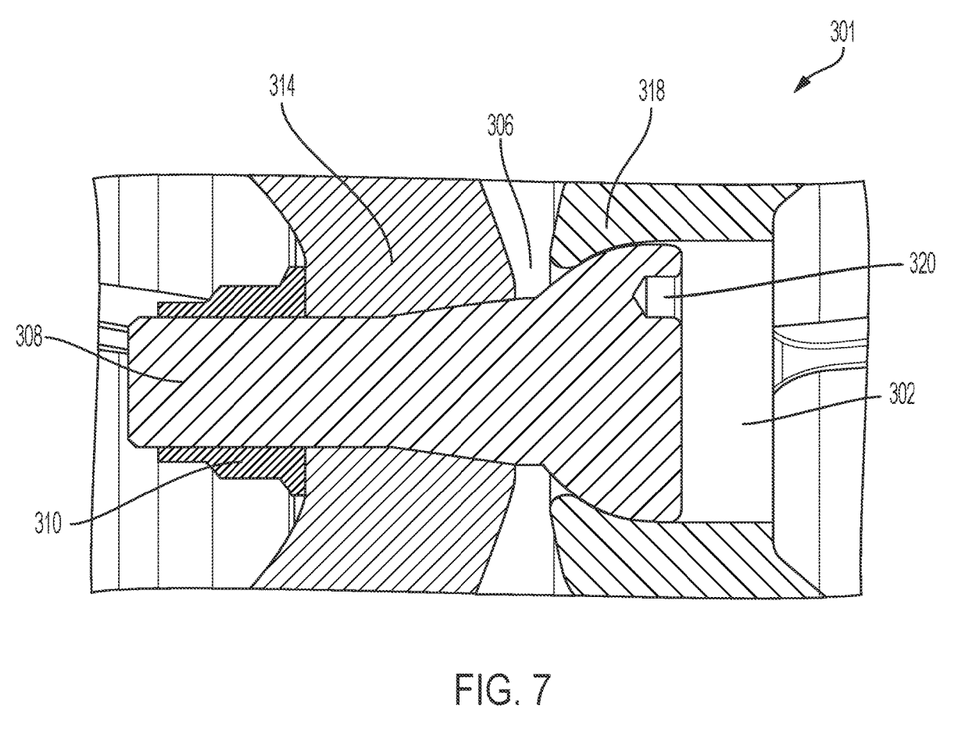
FIG. 7 illustrates a sectioned side view of another gimbal assembly, in accordance with at least one non-limiting aspect of the present disclosure.

Referring now to FIG. 7, a sectioned side view of another gimbal assembly 301 is depicted in accordance with at least one non-limiting aspect of the present disclosure. The gimbal assembly 301 of FIG. 7 is similar to the gimbal assembly 108 of FIG. 2 and it shall be appreciated that any of features discussed herein regarding additional aspects can be implemented in the non-limiting aspect of FIG. 7. For example, according to the non-limiting aspect of FIG. 7, the gimbal assembly 301 can include a first socket 314, a second socket 318, and a joint fastener 308 with similar features to the joint fastener 108 of FIG. 2. Once again, the first socket 314 and the second socket 318 can be mechanically coupled to a first and/or second plurality of struts of a conduit assembly (e.g., conduit assembly 100 of FIG. 1) and oriented to face each other within the internal cavity collectively defined by a first conduit component 302, a second conduit component 304. The first and second sockets 314, 318 can collectively define an aperture 306 that is geometrically configured to properly seat the joint fastener 308.

According to the non-limiting aspect of FIG. 7, the joint fastener 320 can further include means by which the joint fastener 308 can be reacted to a predetermined torque depending on the particular implementation and/or system requirements. For example, according to the non-limiting aspect of FIG. 7, one or more holes 320 can be defined in an end of the joint fastener 308 opposite an end configured to engage a lock nut 310. According to the non-limiting aspect of FIG. 7, the one or more holes 320 can face, and be accessible through, an aperture defined by a socket (e.g., second socket 118 of FIG. 1) of the conduit assembly 100 (FIG. 1). The one or more holes 320 defined in the joint fastener 308 can be geometrically configured as inverse to studs of a mating tool (not shown) used during the assembly of the conduit assembly 100 (FIG. 1). As such, the one or more holes 320 can be used to facilitate a secure engagement with the mating tool and thus, allow a technician to rotate the joint fastener 308 within the conduit assembly 100 (FIG. 1) until the lock nut 310 applies (or reacts) a predetermined torque (or preload) on the joint fastener 308.

Figure 8:
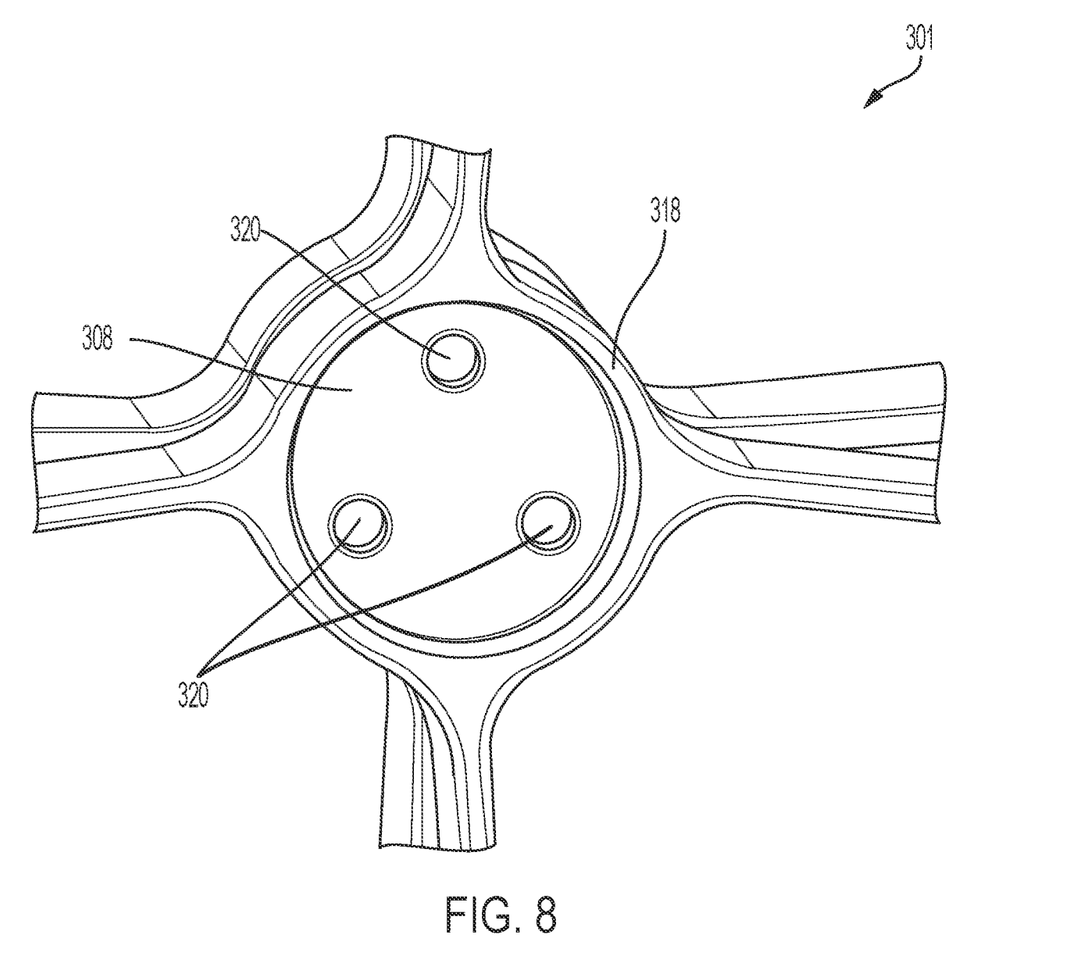
FIG. 8 illustrates a perspective view of the gimbal assembly of FIG. 7, in accordance with at least one non-limiting aspect of the present disclosure.

Referring now to FIG. 8 a perspective view of the gimbal assembly 301 of FIG. 7 is depicted in accordance with at least one non-limiting aspect of the present disclosure. It shall be appreciated that, although the joint fastener 308 of of FIGS. 7 and 8 includes three holes 320 of a circular cross section configured to accommodate circular studs of a mating tool, any quantity of holes 320 of any geometric cross section can be used to facilitate the desired engagement and manipulation of the joint fastener 308 within the conduit assembly 100 (FIG. 1). Additionally, the present disclosure contemplates other means of engaging the joint fastener 308 in a manner similar to the one or more holes 320 of FIGS. 7 and 8. For example, according to some non-limiting aspects, the joint fastener 308 can include a protrusion (not shown) that extends out of the socket and can be gripped by hand or tool. According to other non-limiting aspects, the one or more holes 320 can be tapped. In still other non-limiting aspects, the joint fattener 308 can include a feature machined into its face by which a technician may react the torque.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A gimbal assembly for a flexible conduit configured to convey a medium, the gimbal assembly comprising:
 a first component comprising a first plurality of struts that terminate in a first socket defining a first cavity of a first geometric configuration, and wherein the first component defines an aperture;
 a second component comprising a second plurality of struts that terminate in a second socket defining a second cavity of a second geometric configuration;
 a flexible bellows disposed between and coupled to the first component and the second component; and
 a joint fastener configured to couple the first socket to the second socket, wherein the joint fastener comprises a first portion that geometrically corresponds to the first cavity, an intermediate portion that geometrically corresponds to the aperture such that the intermediate portion can be immovably seated within the aperture, and a second portion that geometrically corresponds to the second cavity, wherein the first portion is dimensionally configured to be immovably seated within the first cavity, and wherein the second portion is configured to be movably retained by the second socket such that the first component can rotate relative to the second component about the second socket.

2. The gimbal assembly of claim 1, wherein an outer surface of the first portion of the joint fastener substantially contacts an inner surface of the first socket when seated within the first cavity.

3. The gimbal assembly of claim 2, wherein the first portion is dimensionally configured to establish a friction fit between the joint fastener and the first socket when seated within the first cavity.

4. The gimbal assembly of claim 1, wherein the aperture defined by the first component and the intermediate portion of the joint fastener both comprise a frustoconical configuration, and wherein the second geometric configuration is hemispheric.

5. The gimbal assembly of claim 1, wherein the joint fastener further comprises a third portion that differs in geometric configuration from the first portion and the second portion.

6. The gimbal assembly of claim 5, further comprising a lock nut configured to mechanically engage the third portion of the joint fastener, thereby securing it to the first socket.

7. The gimbal assembly of claim 6, wherein the lock nut comprises tapped threads, and wherein the third portion comprises a screw configured to engage the tapped threads of the lock nut.

8. The gimbal assembly of claim 7, wherein the lock nut is adjustably configured to apply a predetermined load on the joint fastener and the first socket.

9. The gimbal assembly of claim 6, wherein the mechanical engagement is a press-fit.

10. The gimbal assembly of claim 6, wherein the mechanical engagement is a thermal-fit.

11. The gimbal assembly of claim 6, wherein the lock nut comprises a stake configured to engage at least a portion of the third portion of the joint fastener.

12. The gimbal assembly of claim 1, wherein the first component and the first plurality of struts are integrally formed, and wherein the second component and the second plurality of struts are integrally formed.

13. The gimbal assembly of claim 1, wherein at least a portion of the second portion of the joint fastener comprises a wear-resistant coating.

14. The gimbal assembly of claim 1, wherein the first plurality of struts and the second plurality of struts are angularly oriented such that the first plurality of struts extend towards the second plurality of struts, and wherein the second plurality of struts extend towards the first plurality of struts.

15. The gimbal assembly of claim 1, wherein the geometrical correspondence of the intermediate portion and the aperture enables the gimbal assembly to manage a force exerted on the flexible conduit.

16. A method of assembling a gimbal assembly for a flexible conduit configured to convey a medium, wherein the gimbal assembly comprises a first component comprising a first socket, a second component comprising a second socket, and a joint fastener, wherein the first component defines an aperture, wherein the joint fastener comprises a first portion that geometrically corresponds to a first cavity of the first socket, wherein the joint fastener comprises a second portion that geometrically corresponds to a second cavity of the second socket, and wherein the joint fastener comprises an intermediate portion that geometrically corresponds to the aperture, the method comprising:
- inserting the first portion of the joint fastener through the second cavity of the second socket of a second gimbal component;
- immovably seating the intermediate portion of the joint fastener within the aperture defined by the first component, such that the geometric correspondence between the aperture and intermediate portion of the joint fastener enables the gimbal assembly to manage a force exerted on the flexible conduit;
- seating the first portion of the joint fastener within the first cavity of the first socket, such that the geometric correspondence between the first portion and the first cavity renders the joint fastener immovable relative to the first socket;
- seating the second portion of the joint fastener within the second socket, such that the second portion is movably retained by the second socket and the first component can rotate relative to the second component; and
- securing the joint fastener to the first component via a lock nut.

* * * * *